United States Patent
Jeong et al.

(10) Patent No.: US 10,357,745 B2
(45) Date of Patent: Jul. 23, 2019

(54) MEMBRANE DISTILLATION SYSTEM WHICH IS CAPABLE OF REAL-TIME MONITORING ON MEMBRANE WETTING

(71) Applicant: KOREA INSTITUTE OF SCIENCE AND TECHNOLOGY, Seoul (KR)

(72) Inventors: Seong Pil Jeong, Seoul (KR); hye-won Kim, Seoul (KR); Seockheon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 115 days.

(21) Appl. No.: 15/297,797

(22) Filed: Oct. 19, 2016

(65) Prior Publication Data
US 2017/0354931 A1 Dec. 14, 2017

(30) Foreign Application Priority Data
Jun. 14, 2016 (KR) ........................ 10-2016-0073532

(51) Int. Cl.
*B01D 61/36* (2006.01)
*B01D 65/08* (2006.01)
(Continued)

(52) U.S. Cl.
CPC ......... *B01D 61/368* (2013.01); *B01D 61/364* (2013.01); *B01D 61/366* (2013.01);
(Continued)

(58) Field of Classification Search
CPC ...... B01D 61/12; B01D 61/22; B01D 61/368; B01D 61/364; B01D 61/366; B01D 61/58;
(Continued)

(56) References Cited

U.S. PATENT DOCUMENTS 4,992,380 A * 2/1991 Moriarty ............ G01N 33/1893
422/62
5,525,475 A * 6/1996 Ladouceur ......... G01N 33/5302
210/634
(Continued)

FOREIGN PATENT DOCUMENTS

JP 07-000768 A 1/1995
KR 10-2014-0123347 A 10/2014
KR 10-1551450 B1 9/2015

OTHER PUBLICATIONS

Yongsun Jang et al., Effect of ultrasonic irradiation on membrane fouling and membrane wetting in direct contact membrane distillation process, Journal of Korean Society of Water and Wastewater, Jun. 2016, pp. 343-350, vol. 30, No. 3, Special Issue, Korea.

*Primary Examiner* — Joseph W Drodge
(74) *Attorney, Agent, or Firm* — Goldilocks Zone IP Law

(57) ABSTRACT

Provided is a membrane distillation system capable of real-time monitoring of membrane wetting, which includes: a raw water storage tank configured to store fluid; a membrane distillation water treatment unit configured to receive raw water stored in the raw water storage tank to generate pure water, the membrane distillation water treatment unit having an inlet water chamber into which an inlet water flows from the raw water storage tank, a membrane for separating the inlet water in the inlet water chamber into a steam and a concentrated water, and a treated water chamber for receiving the steam separated by the membrane and concentrating the steam; and a membrane wetting detection unit to detect a membrane wetting phenomenon and a membrane wetting location of the membrane by measuring a light passing through the membrane in real time.

11 Claims, 4 Drawing Sheets

(51) Int. Cl.
*B01D 65/10* (2006.01)
*C02F 1/44* (2006.01)
*B01D 71/26* (2006.01)
*B01D 71/34* (2006.01)
*B01D 71/36* (2006.01)
*B01D 71/40* (2006.01)
*B01D 71/52* (2006.01)
*B01D 71/56* (2006.01)
*B01D 71/68* (2006.01)
*C02F 1/00* (2006.01)
*C02F 103/08* (2006.01)

(52) U.S. Cl.
CPC ............ *B01D 65/08* (2013.01); *B01D 65/10* (2013.01); *B01D 71/26* (2013.01); *B01D 71/34* (2013.01); *B01D 71/36* (2013.01); *B01D 71/40* (2013.01); *B01D 71/52* (2013.01); *B01D 71/56* (2013.01); *B01D 71/68* (2013.01); *C02F 1/008* (2013.01); *C02F 1/447* (2013.01); *B01D 2311/16* (2013.01); *B01D 2325/38* (2013.01); *C02F 2103/08* (2013.01); *C02F 2303/22* (2013.01); *Y02A 20/128* (2018.01); *Y02W 10/37* (2015.05)

(58) Field of Classification Search
CPC ........ B01D 65/08; B01D 65/10; B01D 71/26; B01D 71/34; B01D 71/36; B01D 71/40; B01D 71/52; B01D 71/56; B01D 71/68; B01D 2311/02; B01D 2311/04; B01D 2311/16; B01D 2311/2649; B01D 2325/38; C02F 1/008; C02F 1/447; C02F 2313/08; C02F 2209/00; C02F 2103/08; C02F 2303/22; Y02A 20/128; Y02W 10/37
USPC ......... 210/94, 640, 649, 650, 745, 806, 259, 210/321.6, 500.27, 500.36, 500.37, 210/500.38, 500.41, 500.42
See application file for complete search history.

(56) References Cited

U.S. PATENT DOCUMENTS

| | | | | |
|---|---|---|---|---|
| 8,663,463 | B2* | 3/2014 | Weaver | A61M 1/3639 210/120 |
| 2003/0128371 | A1* | 7/2003 | Vaux | G01N 13/02 356/601 |
| 2004/0104171 | A1* | 6/2004 | Zeiher | B01D 61/12 210/652 |
| 2009/0045144 | A1* | 2/2009 | Cohen | B01D 61/025 210/745 |
| 2013/0327711 | A1* | 12/2013 | Hickenbottom | C02F 1/447 210/636 |
| 2015/0353385 | A1* | 12/2015 | Wang | B01D 69/127 210/640 |
| 2016/0107121 | A1* | 4/2016 | Lienhard | B01D 69/02 210/640 |
| 2016/0310900 | A1* | 10/2016 | Francis | B01D 61/366 |
| 2016/0339393 | A1* | 11/2016 | Warsinger | B01D 65/02 |

* cited by examiner

MEMBRANE DISTILLATION SYSTEM WHICH IS CAPABLE OF REAL-TIME MONITORING ON MEMBRANE WETTING

CROSS-REFERENCE TO RELATED APPLICATIONS

This application claims, under 35 U.S.C. § 119, the priority of Korean Patent Application No. 10-2016-0073532 filed on Jun. 14, 2016 in the Korean Intellectual Property Office, the disclosure of which is incorporated herein by reference in its entirety.

TECHNICAL FIELD

The following disclosure relates to a membrane distillation system capable of real-time monitoring on membrane scaling, and in particular, to a membrane distillation system capable of real-time monitoring on membrane scaling, which may monitor a membrane wetting phenomenon caused by inorganic membrane scaling on a surface of a membrane distillation membrane in real time.

BACKGROUND

Generally, in the membrane distillation, a phase change occurs on a surface of a hydrophobic polymer membrane, and steam passes through fine pores in the surface of the membrane and then is concentrated and separated.

In addition, the membrane distillation may be used in a desalinization process for separating and removing non-volatile substances or low-volatile substances or used for separating organic materials with high volatility in a solution.

Since the concept of the membrane distillation was proposed in 1960s, the membrane distillation has been studied mainly in USA, Europe, Japan and Australia so far. Recently, there is an active movement for replacing the membrane distillation separation process with an existing separation process using evaporation or a reverse osmosis membrane.

At present, an evaporation method and a reverse osmosis method used for a pure water producing process or a desalination process consume much energy. In particular, the reverse osmosis method should perform several preprocesses before usage due to contamination and fouling, which causes difficulty in operation and management and consumes much electric energy as a power source of a pump to cause increased maintenance costs.

Meanwhile, the membrane distillation uses a porous membrane and operates at a lower pressure in comparison to the extracorporeal ultrafiltration method and the reverse osmosis method. The membrane distillation allows separation by means of a difference in partial vapor pressure.

In addition, if the membrane distillation is used, there is no entrainment which is present at a traditional distillation method, when separating and removing non-volatile substances such as salt, and also a filter or membrane operating at a high temperature may not be used.

Due to such advantages of the membrane distillation separation process, a desalination process using the membrane distillation is spotlighted as one of competitive methods for producing drinking water over the world due to low-cost utility and durable separation device.

Meanwhile, the membrane distillation uses a hydrophobic polymer membrane, but since a surface tension of a solvent or solute (hydrophilic material) is greater than a membrane surface, liquid does not pass through membrane pores but makes repulsion at the membrane surface. Also, the material to be separated is phase-converted into steam at an entrance of the pore in the membrane surface and then diffused and permeated into the pores to be finally concentrated and separated at treated water.

The membrane distillation is performed at a membrane module composed of an inlet water part at which an inflow solution passes through the membrane and a treated water part at which the material to be separated is concentrated and separated.

However, since the membrane distillation uses the hydrophobic polymer membrane as a membrane material, the surface of the membrane may be contaminated due to various contaminants contained in a contaminated raw water at the inlet water part of the membrane distillation, and when the membrane is partially hydrophilic-treated, the inlet water may directly pass through the hydrophilic-treated portion, which is called a membrane wetting phenomenon.

If the membrane wetting phenomenon occurs, raw water of the inlet water passes through the membrane, and thus the membrane distillation process for obtaining pure water may not be operated, and if the membrane wetting phenomenon occurs, a membrane de-wetting process for removing membrane scaling material in the pores must be performed.

In an existing technique, the membrane wetting phenomenon has been measured by means of an indirect method, for example by checking an increase of electric conductivity at the treated water part, but it is impossible to measure a location of the membrane where the membrane wetting phenomenon occurs.

Therefore, in order to check membrane scaling during the membrane distillation process, it is demanded to study a real-time direct monitoring method for checking a location of the membrane where the membrane wetting phenomenon occurs.

RELATED LITERATURES

Patent Literature

Korean Patent Registration No. 10-1551450 (published on Sep. 8, 2015)

SUMMARY

An embodiment of the present disclosure is directed to providing a membrane distillation system capable of real-time monitoring of membrane wetting, which may ensure stable processing by checking a membrane wetting phenomenon caused by membrane scaling during a membrane distillation process in real time and measuring the degree of membrane wetting.

In one general aspect of the present disclosure, there is provided a membrane distillation system capable of real-time monitoring of membrane wetting, comprising: a raw water storage tank configured to store various kinds of fluid; a membrane distillation water treatment unit configured to receive raw water stored in the raw water storage tank to generate pure water, the membrane distillation water treatment unit having an inlet water chamber into which an inlet water flows from the raw water storage tank, a membrane for separating the inlet water in the inlet water chamber into a steam and a concentrated water, and a treated water chamber for receiving the steam separated by the membrane and concentrating the steam; and a membrane wetting detection unit to detect a membrane wetting phenomenon and a membrane wetting location of the membrane by measuring a light passing through the membrane in real time.

The membrane wetting detection unit may include: a light source disposed at one side of the membrane and opposite to the membrane to irradiate a light to the membrane; and a detection portion disposed at the other side of the membrane and opposite to the membrane to measure a light passing through the membrane in real time.

The light source may be disposed at the inlet water chamber to irradiate a light to the membrane, and the detection portion may be disposed at the treated water chamber to measure a light passing through the membrane in real time.

A transparent window may be provided at one surface of the inlet water chamber, which is opposite to the membrane, and the light source may be disposed out of the inlet water chamber to irradiate a light to the membrane through the transparent window.

The light source may be disposed in the inlet water chamber to irradiate a light to the membrane.

The light source may include any one light source selected from the group consisting of a light source having a short-wavelength ray of an ultraviolet wavelength or below, a light source having an ultraviolet ray, a light source having a visible ray, a light source having an infrared ray, and a light source having a long-wavelength ray of an infrared wavelength or above.

The detection portion may include an imaging device for measuring a light passing through the membrane.

The membrane wetting detection unit may further include a membrane wetting determination portion for calculating an occurrence of a membrane wetting phenomenon of the membrane and a membrane wetting location on the membrane, depending on whether a light passes through the membrane on the basis of an image measured by the detection portion.

The membrane may be a hydrophobic polymer membrane or a ceramic membrane.

The hydrophobic polymer membrane may be any one selected from the group consisting of polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP) and polyamide (PA).

The membrane distillation water treatment unit may use any one selected from the group consisting of direct contact membrane distillation (DCMD), air gap membrane distillation (AGMD), vacuum membrane distillation (VMD), sweep gas membrane distillation (SGMD) and permeate gap membrane distillation (PGMD).

The membrane distillation system may further comprise a preprocessing unit configured to remove impurities contained in a raw water supplied to the raw water storage tank or a raw water supplied from the raw water storage tank to the inlet water chamber.

The membrane distillation system may further comprise at least one flux control bath provided between the preprocessing unit and the inlet water chamber to store a preprocessed raw water and collect a concentrated water from the inlet water chamber, when the preprocessing unit is provided between the raw water storage tank and the inlet water chamber.

The raw water storage tank and the flux control bath may be made of any one material selected from the group consisting of polyvinyl chloride (PVC), fiber reinforced plastic (FRP), SUS316L and DUPLEX.

In the embodiments of the present disclosure, a membrane wetting detection unit for detecting a membrane wetting phenomenon and a membrane wetting location of a membrane is provided opposite to the membrane to check a membrane wetting phenomenon in real time during the membrane distillation process, and thus the membrane wetting phenomenon may be easily coped with and so the membrane distillation process may be operated stably.

DETAILED DESCRIPTION OF EMBODIMENTS

Figure 1:
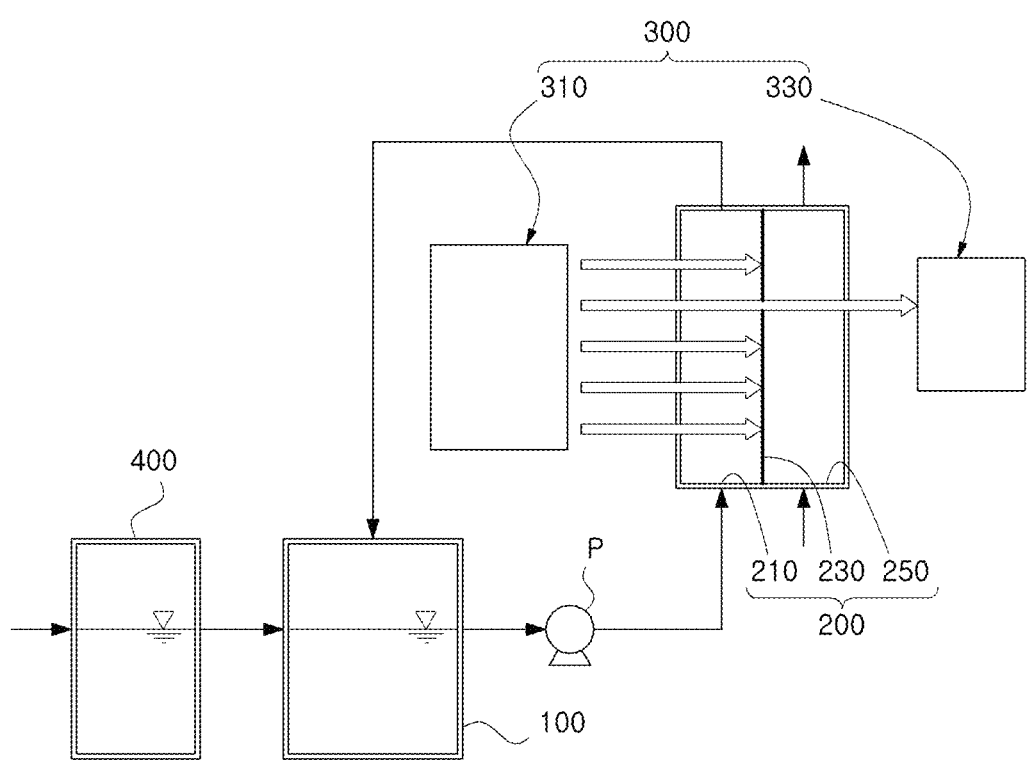
FIG. 1 is a diagram showing a membrane distillation system capable of real-time monitoring on membrane scaling according to the first embodiment of the present disclosure.

The present disclosure, advantages of operations of the present disclosure and objects accomplished by the implementation of the present disclosure can be sufficiently understood with reference to the accompanying drawings depicting embodiments of the present disclosure and explanations thereof.

Hereinafter, an embodiment of the present disclosure will be described in detail with reference to the accompanying drawings. In the drawings, like reference numerals denote like elements.

Hereinafter, an embodiment of the present disclosure will be described in detail with reference to the accompanying drawings.

Figure 2:
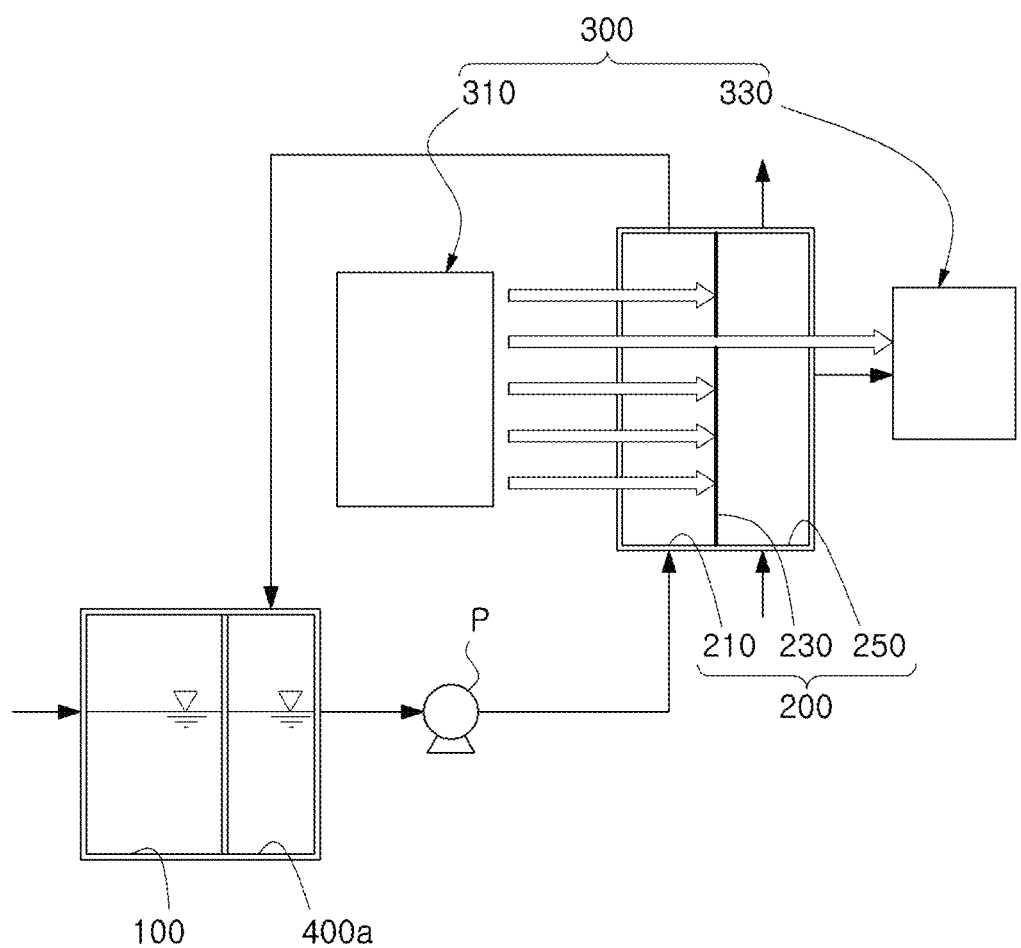
FIG. 2 is a diagram showing a membrane distillation system capable of real-time monitoring on membrane scaling according to the second embodiment of the present disclosure.
Figure 3:
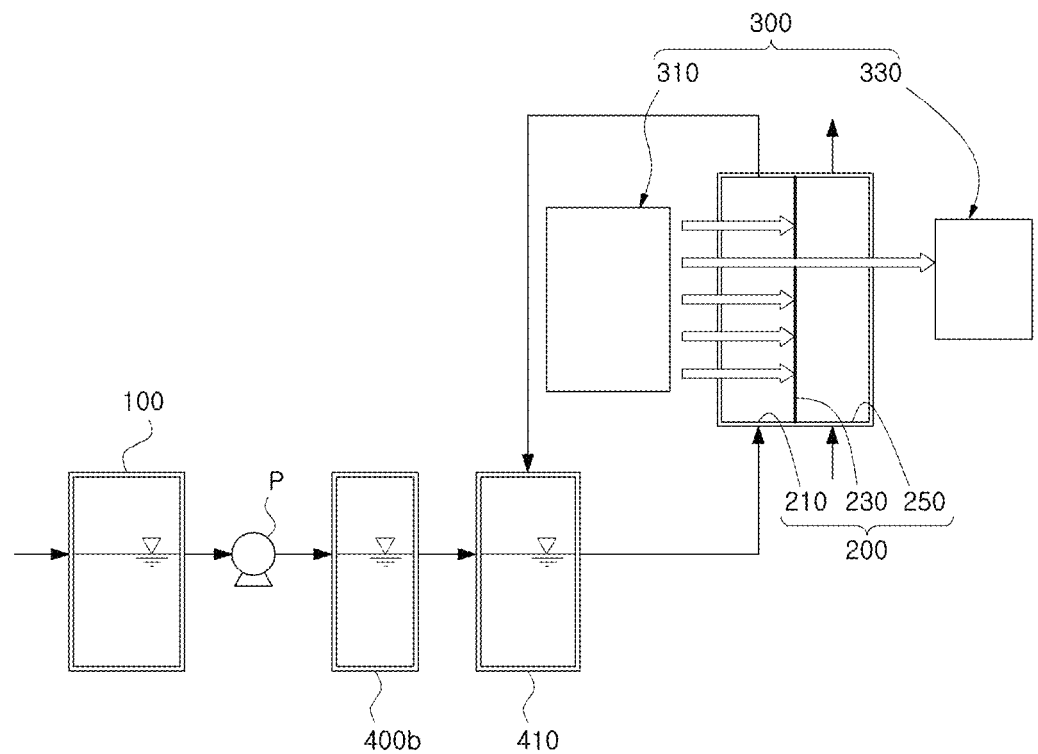
FIG. 3 is a diagram showing a membrane distillation system capable of real-time monitoring on membrane scaling according to the third embodiment of the present disclosure.
Figure 4:
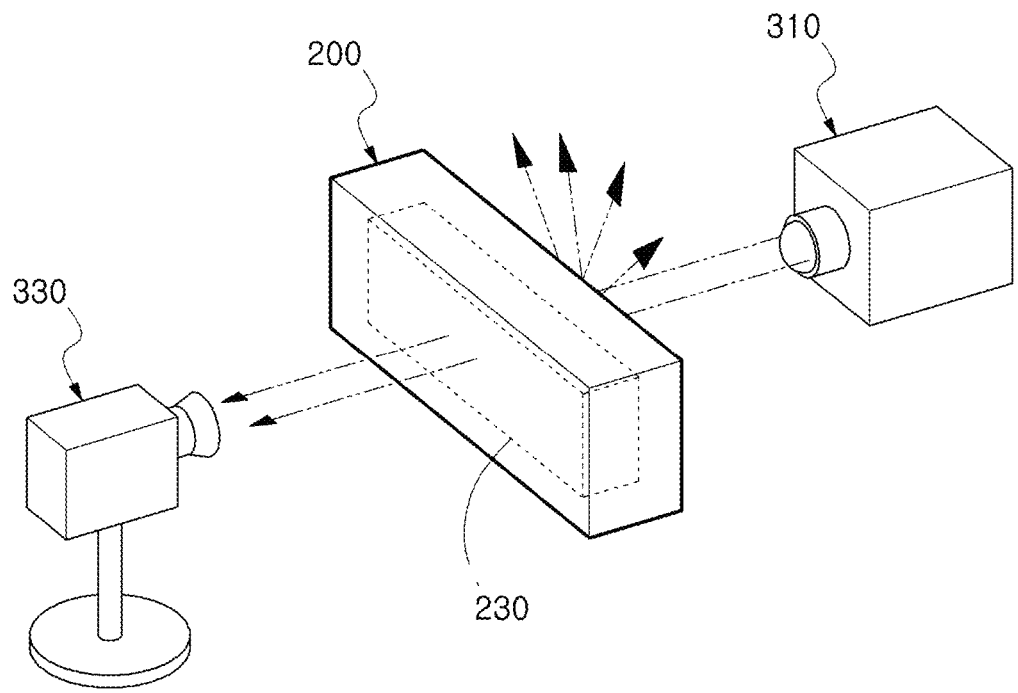
FIG. 4 is a diagram showing a membrane wetting detection unit according to the present disclosure.
Figure 5A:
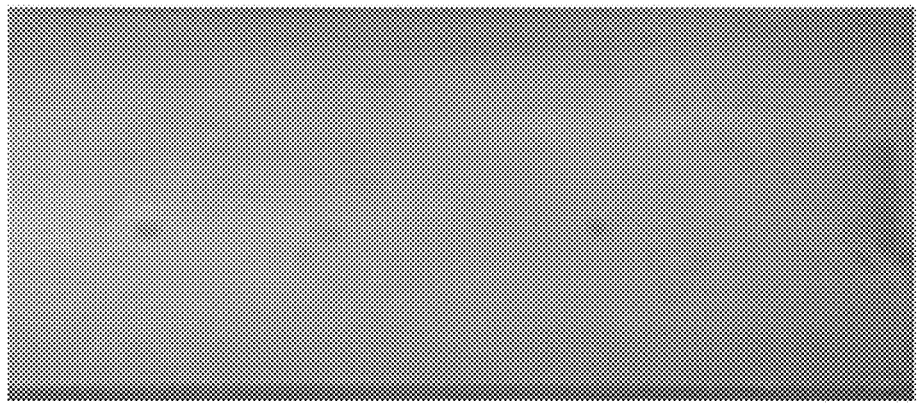
FIGS. 5A to 5C are photographs showing membranes measured by the membrane wetting detection unit during a membrane distillation process.
Figure 5B:
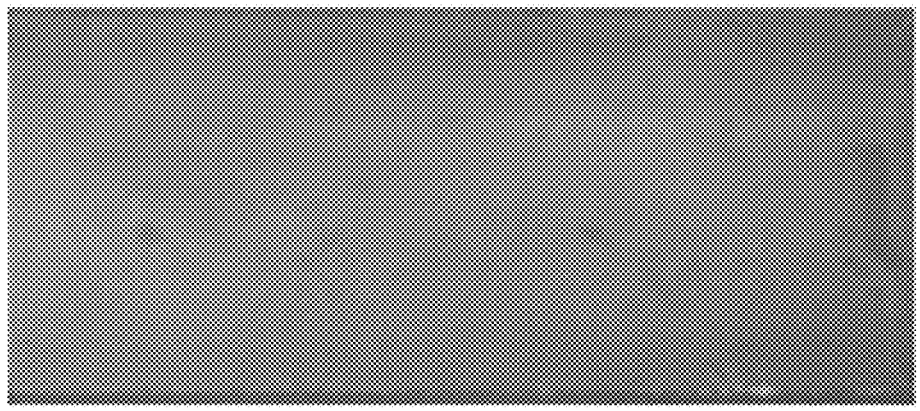
Figure 5C:
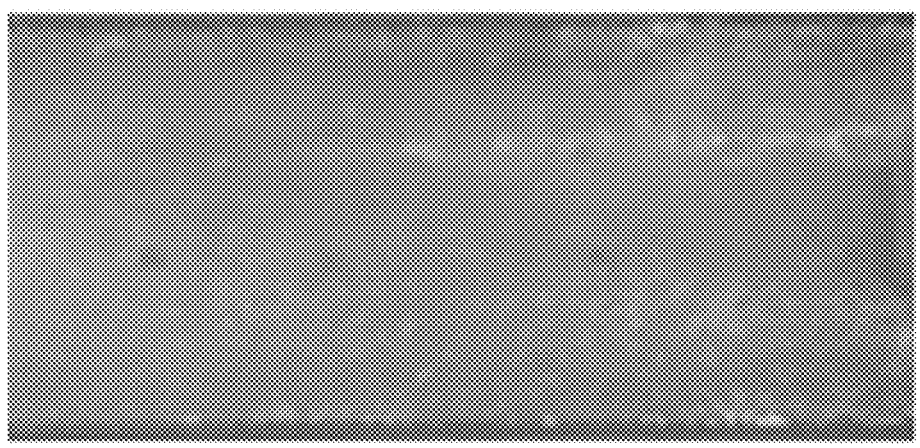

FIG. 1 is a diagram showing a membrane distillation system capable of real-time monitoring on membrane scaling according to the first embodiment of the present disclosure, FIG. 2 is a diagram showing a membrane distillation system capable of real-time monitoring on membrane scaling according to the second embodiment of the present disclosure, FIG. 3 is a diagram showing a membrane distillation system capable of real-time monitoring on membrane scaling according to the third embodiment of the present disclosure, FIG. 4 is a diagram showing a membrane wetting detection unit according to the present disclosure, and FIGS. 5A to 5C are photographs showing membranes measured by the membrane wetting detection unit during a membrane distillation process.

Referring to FIGS. 1 to 3, a membrane distillation system capable of real-time monitoring on membrane scaling according to the present disclosure includes a raw water storage tank 100 for storing various kinds of fluid, a preprocessing unit for removing impurities contained in a raw water, a membrane distillation water treatment unit 200 for receiving an inlet water prepared by removing impurities contained in the raw water to generate a pure water by using a membrane 230, and a membrane wetting detection unit 300 disposed opposite to the membrane 230 to detect a membrane wetting phenomenon and a membrane wetting location of the membrane 230.

The membrane distillation system capable of real-time monitoring on membrane scaling according to the present disclosure may detect an occurrence of a membrane wetting phenomenon of the membrane 230 and a membrane wetting location on the membrane 230 in real time during a pure water generating process by using the membrane 230 of the membrane distillation water treatment unit 200.

The raw water storage tank 100 stores various kinds of fluid therein. The fluid stored in the raw water storage tank 100 includes impurities, namely various organic substances.

In other words, the raw water may be a fresh water, a brackish water, a seawater, a reverse osmosis concentrated water, a wastewater, a sludge or the like containing contaminants, or a food concentrate generating a pure water or requiring concentration, an acid or base, various medicine wastewaters, a ultra-pure water or the like.

In addition, the raw water storage tank 100 may be made of metal or non-metal which does not react with the raw water.

In detail, the raw water storage tank 100 may be made of any one selected from the group consisting of polyvinyl chloride (PVC), fiber reinforced plastic (FRP), SUS316L and DUPLEX.

In addition, the preprocessing unit 400, 400a, 400b plays a role of removing impurities contained in the raw water.

The preprocessing unit 400, 400a, 400b may be installed to remove impurities contained in the raw water supplied to the raw water storage tank 100 as shown in FIG. 1, or to remove impurities contained in the raw water supplied from the raw water storage tank 100 to an inlet water chamber 210 of the membrane distillation water treatment unit 200, explained later, as shown in FIGS. 2 and 3.

As shown in FIG. 1, the preprocessing unit 400 according to the first embodiment may be disposed at the front of the raw water storage tank 100 to preprocess a raw water supplied to the raw water storage tank 100 in advance.

The preprocessing unit 400 is connected to the raw water storage tank 100 to supply the preprocessed raw water to the raw water storage tank 100. At this time, the raw water storage tank 100 is connected to the membrane distillation water treatment unit 200, explained later, to receive and store a concentrated water generated at the inlet water chamber 210.

The concentrated water and the preprocessed raw water supplied from the inlet water chamber 210 as described above are mixed at the raw water storage tank 100 with each other and supplied again to the inlet water chamber 210. Here, the concentrated water and the preprocessed raw water are mixed to form an inlet water, and the inlet water is supplied to the inlet water chamber 210.

In addition, a supply pump P is provided between the raw water storage tank 100 and the inlet water chamber 210 to supply the concentrated water and the preprocessed raw water, mixed at the raw water storage tank 100 with each other, to the inlet water chamber 210.

In addition, as shown in FIG. 2, the preprocessing unit 400a according to the second embodiment may be directly coupled to the raw water storage tank 100. At this time, the preprocessing unit 400a is connected to the membrane distillation water treatment unit 200, explained later, to receive and store a concentrated water generated at the inlet water chamber 210.

The concentrated water and the preprocessed raw water supplied from the inlet water chamber 210 as described above are mixed with each other at the preprocessing unit 400a and is then supplied again to the inlet water chamber 210. Here, the concentrated water and the preprocessed raw water are mixed to form an inlet water, and the inlet water is supplied to the inlet water chamber 210.

In addition, a supply pump P is provided between the preprocessing unit 400a and the inlet water chamber 210 to supply the concentrated water and the preprocessed raw water, mixed at the preprocessing unit 400a, to the inlet water chamber 210.

Meanwhile, though not shown in FIG. 2, a flux storage tank (not shown) may be provided at the rear of the preprocessing unit, separately from the preprocessing unit 400a, and the flux control bath 410 (not shown) may be connected to the preprocessing unit 400a to receive and store a preprocessed raw water and is also connected to the inlet water chamber 210, explained later, to receive and store a concentrated water generated at the inlet water chamber 210.

The concentrated water and the preprocessed raw water supplied to the flux control bath 410 (not shown) may be mixed with each other in the flux control bath 410 (not shown) and are then supplied again to the inlet water chamber 210 by means of the supply pump P.

In addition, the flux storage tank may be made of metal or non-metal which does not react with the concentrated water and the preprocessed raw water. In detail, the flux storage tank may be made of any one selected from the group consisting of polyvinyl chloride (PVC), fiber reinforced plastic (FRP), SUS316L and DUPLEX.

In addition, as shown in FIG. 3, the preprocessing unit 400b according to the third embodiment may be disposed at the rear of the raw water storage tank 100.

Meanwhile, if the preprocessing unit 400b is disposed at the rear of the raw water storage tank 100 as shown in FIG. 3, in more detail if the preprocessing unit 400b is provided or disposed between the raw water storage tank 100 and the inlet water chamber 210 of the membrane distillation water treatment unit 200, explained later, at least one flux control bath 410 is further provided between the preprocessing unit 400b and the inlet water chamber 210.

Here, the flux control bath 410 is connected to the preprocessing unit 400b to receive and store the preprocessed raw water, and is also connected to the inlet water chamber 210, explained later, to receive and store a concentrated water generated at the inlet water chamber 210.

The concentrated water and the preprocessed raw water supplied to the flux control bath 410 are mixed with each other in the flux control bath 410 and are then supplied again to the inlet water chamber 210 by means of the supply pump P. Here, the concentrated water and the preprocessed raw water are mixed to form an inlet water, and the inlet water is supplied to the inlet water chamber 210.

In addition, the flux storage tank may be made of metal or non-metal which does not react with the concentrated water and the preprocessed raw water. In detail, the flux storage tank may be made of any one selected from the group consisting of polyvinyl chloride (PVC), fiber reinforced plastic (FRP), SUS316L and DUPLEX.

Meanwhile, even though FIGS. 1 to 3 illustrate a single preprocessing unit 400, 400a, 400b, the present disclosure is not limited thereto, and a plurality of preprocessing units 400, 400a, 400b may be installed depending on the scale or service environment of the membrane distillation system.

In addition, even though FIGS. 1 to 3 illustrates that the preprocessing unit 400, 400a, 400b is in the form of a storage tank, the present disclosure is not limited thereto.

For example, the preprocessing unit 400, 400a, 400b may be inserted into a pipe connected to the raw water storage tank 100 and the membrane distillation water treatment unit 200 or installed at an exterior of the pipe, without being limited thereto.

Meanwhile, in the present disclosure, the preprocessing unit 400, 400a, 400b is a device for controlling impurities such as particles, organic foulant, microorganism, inorganic foulant or the like, which may be generated in the membrane distillation process. In particular, particles, organic foulant and microorganism may need to be controlled since they may be complicatedly combined with inorganic foulant.

For this, the preprocessing unit 400, 400a, 400b performs at least one process selected from the group consisting of an inorganic ion control process, an organic matter control process, a microorganism control process and a particle control process.

In more detail, the preprocessing unit 400, 400a, 400b performs at least one process selected from the group consisting of concentration, precipitation, filtration (sand filtration, dual media filtration, multi-media filtration, cartridge filter, microfiltration (MF)/ultrafiltration (UF)/nanofiltration (NF)/reverse osmosis (RO)/membrane distillation (MD)/forward osmosis (FO) membrane), sterilization (HOCl, NaOCl, UV irradiation), a microorganism process, ion exchange (softening), chemical treatment (acid, base, disinfectant, detergent, anti-scalant), and adsorption (activated carbons, filter absorber, resins or the like).

In addition, the preprocessing unit 400, 400a, 400b may inject a drug continuously or intermittently in order to prevent membrane scaling during a membrane distillation process, and may also inject a drug of a high concentration for a short time in order to clean the membrane.

For this, a cleaning process for the membrane 230 and the inlet water chamber 210 may be further included in the membrane distillation process, and any drug capable of cleaning contaminants of the membrane 230 or a pipe may be used for cleaning, such as removal of organic and inorganic substances or sterilization.

For example, the drug may include a pH regulator, an Eh regulator, a precipitator, a coagulant, a disinfectant, an anti-scalant and so on, and the drug may also include any kind of drug capable of changing chemical compositions of various kinds of fluid, without being limited to the above.

In addition, the membrane distillation water treatment unit 200 receives the inlet water and generates a pure water by using the membrane 230.

The membrane distillation water treatment unit 200 of this embodiment may adopt any of an immersion type and a pressurized type, and may adopt any one method selected from the group consisting of direct contact membrane distillation (DCMD), air gap membrane distillation (AGMD), vacuum membrane distillation (VMD), sweep gas membrane distillation (SGMD) and permeate gap membrane distillation (PGMD).

Here, in the direct contact membrane distillation (DCMD), warm water and cold water make direct contact with both sides of the membrane. Also, in the air gap membrane distillation (AGMD), a warm raw water comes into contact with the inlet water chamber of the membrane, an air gap is present at the treated water chamber, and a cooling plate is provided at a side opposite to the air gap to cool air. Also, in the vacuum membrane distillation (VMD), a warm raw water comes into contact with the inlet water chamber of the membrane, an air gap is present at the treated water chamber, and air is sucked out at the corresponding air gap (into a vacuum) so that air containing a steam comes into contact with an additional concentration device to obtain a pure water. Also, in the sweep gas membrane distillation (SGMD), a warm raw water comes into contact with the inlet water chamber of the membrane, an air gap is provided at the treated water chamber, a sweep gas capable of absorbing a steam passes through the air gap, and a pure water is obtained at an additional concentration device. Also, in the permeate gap membrane distillation (PGMD), a warm raw water comes into contact with the inlet water chamber of the membrane, a fluid layer (a layer filled with water) is present at the treated water chamber, and a cooling plate is provided at a side opposite to the fluid layer to cool the fluid.

The membrane distillation water treatment unit 200 includes an inlet water chamber 210 for allowing an inlet water to flow in, a membrane 230 for separating the inlet water in the inlet water chamber 210 into a steam and a concentrated water, and a treated water chamber 250 for supplying the steam separated by the membrane 230 and concentrating the steam.

In this embodiment, even though the membrane 230 is illustrated as a planar membrane, the membrane 230 may also be applied as a hollow fiber membrane, a tube-type membrane or the like.

Also, in this embodiment, the membrane 230 may be a hydrophobic polymer membrane 230 or a ceramic membrane.

In addition, the hydrophobic polymer membrane 230 may be made of any one selected from the group consisting of polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP) and polyamide (PA).

According to the membrane distillation water treatment unit 200 of this embodiment, an inlet water is supplied to the inlet water chamber 210 by means of the supply pump P. The inlet water supplied to the inlet water chamber 210 is separated into a pure steam and a concentrated water by the vapor pressure difference formed due to a difference in temperature between the inlet water chamber 210 and the treated water chamber 250 on the basis of the membrane 230.

The pure steam passes through the membrane 230, moves to the treated water chamber 250, and is concentrated at the treated water chamber 250 to generate a pure water. In addition, the pure water generated at the treated water chamber 250 is supplied to a pure water storage tank (not shown). The pure water storage tank is provided at one side of the membrane distillation water treatment unit 200 and is connected to the treated water chamber 250. In addition, the pure water storage tank may be made of metal or non-metal which does not react with the pure water.

In addition, the concentrated water is discharged by means of a pressure generated by the supply pump P, and is supplied to the raw water storage tank 100 as shown in FIG. 1, supplied to the preprocessing unit 400a as shown in FIG. 2 or supplied to the flux control bath 410 as shown in FIG. 3.

When the membrane distillation process is performed repeatedly, the membrane 230 is exposed to the inlet water containing contaminants. Therefore, a membrane scaling phenomenon, particularly a membrane wetting phenomenon, may occur at the membrane 230.

The membrane wetting phenomenon means that when a strong pressure is applied to the membrane 230 in the membrane distillation process or hydrophilic contaminants (for example, Ca-based crystals) are formed in the pores of the membrane 230 to have a hydrophilic property, the contaminated water of the inlet water chamber 210 directly passes through the membrane 230 and moves to the treated water chamber 250.

When the membrane wetting phenomenon occurs, the pure water generated in the treated water chamber 250 is mixed with the contaminated water, and thus it is impossible to perform the membrane distillation process. Therefore, generally, in order to avoid the membrane wetting phenomenon, a strong pressure is not applied to the membrane 230, or a membrane scaling phenomenon of the membrane 230 is prevented. In addition, if the membrane wetting phenomenon occurs, a recovery process is performed.

In an existing technique, a membrane wetting phenomenon is observed by measuring electric conductivity, but the membrane wetting phenomenon may be checked after an inlet water moves to the treated water chamber 250. In addition, in an existing method, a membrane wetting phenomenon may appear in just a part of the membrane 230 since membrane scaling is partially generated or the membrane 230 is partially damaged or heterogeneously provided, and thus it is impossible to expect the membrane wetting phenomenon.

Therefore, in this embodiment, a membrane wetting detection unit 300 for optically checking that a membrane wetting phenomenon occurs at a specific location of the membrane 230 is provided.

In this embodiment, the membrane wetting detection unit 300 is provided to monitor a membrane wetting phenomenon generated in a membrane distillation process in real time.

The membrane wetting detection unit 300 is disposed opposite to the membrane 230 to detect a membrane wetting phenomenon and a membrane wetting location of the membrane 230 by measuring a light passing through the membrane 230 in real time.

Referring to FIG. 4, the membrane wetting detection unit 300 includes a light source 310 disposed at one side of the membrane 230 and opposite to the membrane 230 to irradiate a light to the membrane 230, a detection portion 330 disposed at the other side of the membrane 230 and opposite to the membrane 230 to measure a light passing through the membrane 230 in real time, and a membrane wetting determination portion (not shown) calculating an occurrence of a membrane wetting phenomenon of the membrane 230 and a membrane wetting location on the membrane 230, depending on whether a light passes through the membrane 230 on the basis of an image measured by the detection portion 330.

The light source 310 is disposed at the inlet water chamber 210 to irradiate a light to one side of the membrane 230.

In detail, as shown in FIG. 4, the light source 310 may be disposed out of the inlet water chamber 210 to irradiate a light to the membrane 230 through a transparent window provided at one surface of the inlet water chamber 210 which is opposite to the membrane 230. As a corresponding configuration, the detection portion 330 may be disposed out of the treated water chamber 250 to detect a light passing through the membrane 230 via a transparent window provided at one surface of the treated water chamber 250 which is opposite to the membrane 230.

Also, though not shown in the figures, the light source 310 may also be disposed in the inlet water chamber 210 to irradiate a light to the membrane 230. In addition, though not shown in the figures, the light source 310 may also be disposed on the membrane 230.

The light source 310 may include any one light source selected from the group consisting of a light source having a short-wavelength ray of an ultraviolet wavelength or below, a light source having an ultraviolet ray, a light source having a visible ray, a light source having an infrared ray, and a light source having a long-wavelength ray of an infrared wavelength or above, without being limited thereto, and in this embodiment, the light source 310 may employ any kind of light source which is capable of irradiating a light to the membrane 230.

In addition, the membrane distillation water treatment unit 200 may be disposed in a darkroom, and slits of various shapes may be formed at the darkroom so that a solar ray, a fluorescent light, a flame, a light or the like may be irradiated to the membrane 230 through the slits.

Moreover, the detection portion 330 is disposed opposite to the other side of the membrane 230. In other words, the detection portion 330 is disposed at a side opposite to the light source 310 with the membrane 230 being interposed therebetween to measure a light passing through the membrane 230 in real time.

The detection portion 330 measures a light passing through the membrane 230 and includes an imaging device such as a file-type camera, a charge-coupled device (CCD) camera or the like. In addition, the detection portion 330 may be disposed in or out of the treated water chamber 250.

The detection portion 330 measures a membrane wetting phenomenon on the basis of the change of an image obtained by photographing the membrane 230 with a light passing through the surface of the membrane 230.

In other words, if a hydrophilic membrane scaling material (for example, Ca-based crystals) grows in the pore of the membrane 230 in the membrane distillation process, the membrane 230 partially has a hydrophilic property, and some Ca-based crystals growing to a certain size or more allow the light to pass. Therefore, different from the point of time before the membrane wetting phenomenon occurs as shown in FIG. 5A or when the steam moving to the treated water chamber 250 starts decreasing in the membrane distillation process as shown in FIG. 5B, the light passing through the membrane 230 is measured relatively lighter by the CCD camera provided at the treated water chamber 250 as shown in FIG. 5C.

In addition, the membrane wetting determination portion (not shown) calculates an occurrence of a membrane wetting phenomenon of the membrane 230 and a membrane wetting location on the membrane 230, depending on whether a light passes through the membrane 230 on the basis of an image measured by the detection portion 330. In addition, the membrane wetting determination portion may generate a control signal for controlling an operation in the membrane distillation process by utilizing data or a calculation equation input in advance on the basis of the image measured by the detection portion 330 or by evaluating data stored through measurement.

The present disclosure is not limited to the embodiments described above, but it is obvious to those having ordinary skill in the art that the present disclosure may be changed or modified in various ways without departing from the scope thereof. Therefore, such changes or modifications should be regarded as falling into the scope of the appended claims.

| [Reference Symbols] | |
| --- | --- |
| 100: raw water storage tank | 200: membrane distillation water treatment unit |
| 210: inlet water chamber | 230: membrane |
| 250: treated water chamber | 300: membrane wetting detection unit |

| [Reference Symbols] | |
|---|---|
| 310: light source | 330: detection portion |
| 400, 400a, 400b: preprocessing unit | 410: flux control bath |

What is claimed is:

1. A membrane distillation system capable of real-time monitoring of membrane wetting, comprising:
   a raw water storage tank configured to store fluid;
   a membrane distillation water treatment unit configured to receive raw water stored in the raw water storage tank to generate pure water, the membrane distillation water treatment unit having an inlet water chamber into which an inlet water flows from the raw water storage tank, a membrane for separating the inlet water in the inlet water chamber into a steam and a concentrated water, and a treated water chamber for receiving the steam separated by the membrane and concentrating the steam; and
   a membrane wetting detection unit configured to detect a membrane wetting phenomenon and a membrane wetting location of the membrane by measuring a light passing through the membrane in real time,
   wherein the membrane wetting detection unit includes a light source configured to irradiate a light to the membrane and a detection portion to measure a light passing through the membrane in real time,
   wherein the detection portion is disposed on a side of the membrane which is opposite to the light source,
   wherein the membrane is vertically installed in the membrane distillation water treatment unit,
   wherein the light source is disposed in the inlet water chamber to irradiate a light to the membrane, and
   wherein the detection portion is disposed at the treated water chamber to measure a light passing through the membrane in real time.

2. The membrane distillation system capable of real-time monitoring of membrane wetting according to claim 1,
   wherein the light source includes any one light source selected from the group consisting of a light source having a short-wavelength ray of an ultraviolet wavelength or below, a light source having an ultraviolet ray, a light source having a visible ray, a light source having an infrared ray, and a light source having a long-wavelength ray of an infrared wavelength or above.

3. The membrane distillation system capable of real-time monitoring of membrane wetting according to claim 1,
   wherein the detection portion includes an imaging device for measuring a light passing through the membrane.

4. The membrane distillation system capable of real-time monitoring of membrane wetting according to claim 1,
   wherein the membrane is a hydrophobic polymer membrane or a ceramic membrane.

5. The membrane distillation system capable of real-time monitoring of membrane wetting according to claim 4,
   wherein the hydrophobic polymer membrane is of any one material selected from the group consisting of polytetrafluoroethylene (PTFE), polyvinylidene fluoride (PVDF), polysulfone (PSF), polyether sulfone (PES), polyether imide (PEI), polyimide (PI), polyethylene (PE), polypropylene (PP) and polyamide (PA).

6. The membrane distillation system capable of real-time monitoring of membrane wetting according to claim 1,
   wherein the membrane distillation water treatment unit can perform a process selected from the group consisting of direct contact membrane distillation (DCMD), air gap membrane distillation (AGMD), vacuum membrane distillation (VMD), sweep gas membrane distillation (SGMD) and permeate gap membrane distillation (PGMD).

7. The membrane distillation system capable of real-time monitoring of membrane scaling wetting according to claim 1, further comprising:
   a preprocessing unit configured to be disposed at the front of the raw water storage tank, to remove impurities contained in the raw water, and to supply a preprocessed water to the raw water storage tank.

8. A membrane distillation system capable of real-time monitoring of membrane wetting, comprising:
   a raw water storage rank configured to store fluid;
   a membrane distillation water treatment unit configured to receive raw water stored in the raw water storage tank to generate pure water, the membrane distillation water treatment unit having an inlet water chamber into which an inlet water flows from the raw water storage tank, a membrane for separating the inlet water in the inlet water chamber into a steam and a concentrated water, and a treated water chamber for receiving the steam separated by the membrane and concentrating the stream; and
   a membrane wetting detection unit configured to detect a membrane wetting phenomenon and a membrane wetting location of the membrane by measuring a light passing through the membrane in real time,
   wherein the membrane wetting detection unit includes a light source configured opposite to the light source,
   wherein the membrane is vertically installed in the membrane distillation water treatment unit,
   wherein a transparent window is provided at one surface of the inlet water chamber and the light source is disposed out of the inlet water chamber to irradiate a light to the membrane through the transparent window, and
   wherein the detection portion is disposed at the treated water chamber to measure a light passing through the membrane in real time.

9. A membrane distillation system capable of real-time monitoring of membrane wetting, comprising:
   a raw water storage tank configured to store fluid;
   a membrane distillation water treatment unit configured to receive raw water stored in the raw water storage tank to generate pure water, the membrane distillation water treatment unit having an inlet water chamber into which an inlet water flows from the raw water storage tank, a membrane for separating the inlet water in the inlet water chamber into a steam and a concentrated water, and a treated water chamber for receiving the steam separated by the membrane and concentrating the steam;
   a preprocessing unit provided between the raw water storage tank and the inlet water chamber; and
   a membrane wetting detection unit configured to detect a membrane wetting phenomenon and a membrane wetting location of the membrane by measuring a light passing through the membrane in real time,
   wherein the membrane wetting detection unit includes a light source configured to irradiate a light to the membrane and a detection portion to measure a light passing through the membrane in real time,
   wherein the detection portion is disposed on a side of the membrane which is opposite to the light source, and wherein the membrane is vertically installed in the membrane distillation water treatment unit.

10. The membrane distillation system capable of real-time monitoring of membrane wetting according to claim 9, further comprising:
   at least one flux control bath provided between the preprocessing unit and the inlet water chamber to store a preprocessed raw water and collect a concentrated water from the inlet water chamber.

11. The membrane distillation system capable of real-time monitoring of membrane wetting according to claim 10,
   wherein the raw water storage tank and the flux control bath are made of any one material selected from the group consisting of polyvinyl chloride (PVC), fiber reinforced plastic (FRP), SUS316L stainless steel and DUPLEX stainless steel.

* * * * *